May 10, 1932.  E. T. BURTON  1,858,037
ZERO CORRECTING CIRCUIT
Filed July 19, 1928  3 Sheets-Sheet 1

INVENTOR
EVERETT T. BURTON
BY
J. W. Schmied
ATTORNEY

INVENTOR
EVERETT T. BURTON
BY J. W. Schmied
ATTORNEY

Patented May 10, 1932

1,858,037

UNITED STATES PATENT OFFICE

EVERETT T. BURTON, OF MILLBURN, NEW JERSEY, ASSIGNOR TO BELL TELEPHONE LABORATORIES, INCORPORATED, OF NEW YORK, N. Y., A CORPORATION OF NEW YORK

ZERO CORRECTING CIRCUIT

Application filed July 19, 1928. Serial No. 293,816.

This invention relates to signal transmission systems and more particularly to receiving systems for use in connection with submarine cables or other high capacity conductors.

One object is to correct for the effect known as zero wander in a highly efficacious manner.

A feature of the invention is the use of high permeability inductance coils in combination with suitable circuit arrangements to effect the correction.

It is well known in the art that signaling over high capacity cables, such as submarine cables, by means of positive and negative impulses, earth currents or a temporary preponderance of impulses of one polarity will cause an accumulative charging effect in the cable which manifests itself as an apparent shifting of the zero line in the direction of the impulse, which, for the time being, predominates. The distorted signal wave arriving at the receiving end of the cable may, in other words, be said to consist of two components; one, the high frequency current reversals sent out by the transmitting station, and the other a low frequency variation, representing the fluctuating charge on the cable following the momentary preponderance of impulses of one or the other polarity.

When the receiving apparatus is a siphon recorder, the shifting of the zero, or as is commonly called, zero wander, is of relatively minor importance, but when relays are to be operated it becomes essential to limit the amplitude of zero wander effects to a rather small proportion of the total signal impulse amplitude. If the shifting of the zero becomes more than 20 per cent of the normal signal amplitude the current in the relay windings of the receiving circuit may not be sufficient to move the armatures of the relays into engagement with both contacts and the relays will fail to operate, thus rendering the signals unintelligible.

In the case of printing telegraph systems where the apparatus at the opposite ends of the cable must be held in synchronism, the uncertainty of the operation of relays caused by zero wander, in turn causes serious variation in synchronism and may make operation impossible.

According to the present invention the correction for zero wander is effected by a pair of transformers which operate in the output circuit of a multi-stage amplifier. The transformer cores are preferably composed of magnetic material of high permeability such as described in United States patent to Elmen 1,586,884, June 1, 1926, and are designed to become magnetically saturated by the signaling current at a low amplitude. Therefore as a cyclically varying signaling current in the primary winding increases and decreases, between zero and maximum values, there are intervals of very short duration wherein the transformer cores are unsaturated and the inductance thereof rises for an instant to a high value thereby producing short voltage impulses in the secondary windings. By adding biasing windings to the transformers and applying equal and opposite currents to these windings the transformer cores may be made to become saturated at a higher amplitude and the result is to shift the point from near the zero value of the primary current at which the secondary impulses occur to the position where the magneto-motive force of the primary current is equal and opposite to that of the current in either biasing windings. By adjusting the biasing currents to change the position at which the sum of the magneto-motive forces is equal to zero, to the normal peak values of the primary current, any signal which exceeds these normal peak values will produce a secondary impulse which is changed in polarity and impressed on the primary current to restore the apparent zero to its true position.

The invention will be described in connection with the accompanying drawings, in which:

Fig. 1 diagrammatically shows a circuit including a pair of high permeability transformers connected in the output circuit of a multi-stage vacuum tube amplifier, whereof the secondary windings are connected through separate rectifiers to a common feedback circuit;

Figure 1:
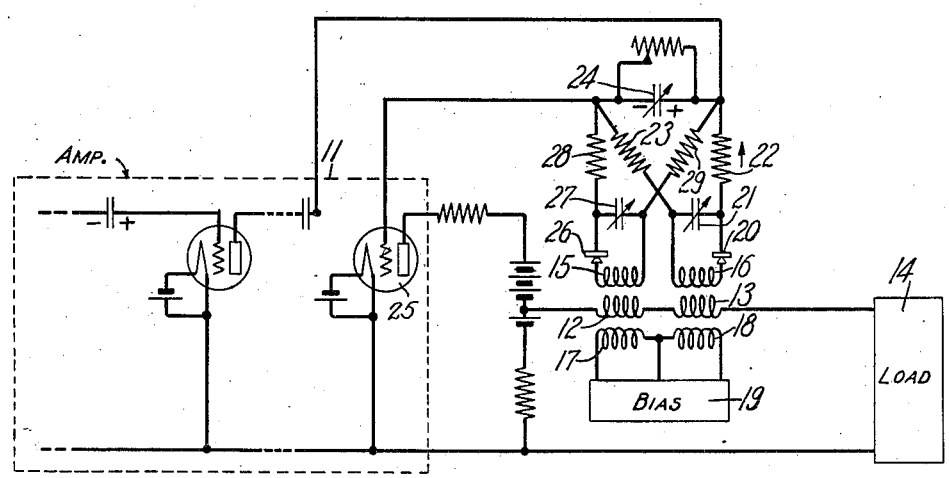

Referring to Fig. 1 which represents a simple embodiment of the invention, a multistage vacuum tube amplifier 11 is connected through the primary windings 12 and 13 of a pair of high permeability transformers to a receiving circuit 14. The transformer cores are designed to become magnetically saturated at the low amplitudes of the signaling current flowing in the output circuit of amplifier 11. In the absence of biasing windings or biasing current it is during the interval in which the signaling current is rising through the very low amplitudes that the inductance of the primary windings would be caused to rise to a high value to thereby produce a short sharp impulse in the secondary windings 15 and 16. However, the intervals during which the secondary impulses occur may be changed to include any particular range of signaling current amplitudes, by employing additional windings 17 and 18 and by applying thereto opposite biasing currents of such value that the transformer cores may be maintained magnetically saturated during the time that the signaling current is rising from zero value to the particular value at which the magnetomotive force of the signaling current overcomes that of the current in either of the biasing windings. The biasing current is furnished from a source 19 of direct current and is arranged to flow in opposite directions through the windings 17 and 18. In this way the inductance of the primary windings is negligible up to the point where the magnetomotive force of the signaling current overcomes that of the biasing current in either of windings 17 and 18 and then the inductance rapidly rises to a high value where it is effective to produce a short sharp impulse in one or the other of the secondary windings 15 and 16, the winding selected, depending upon the polarity of the signaling current impulse flowing at the time in the primary windings 12 and 13.

Figure 2:
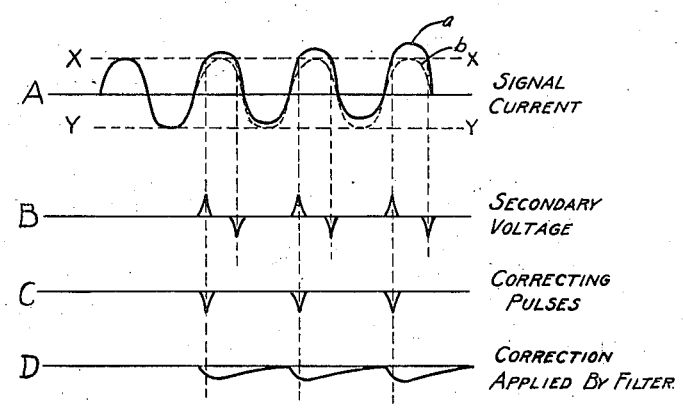
Fig. 2 represents the signal current in the primary windings, the corresponding voltage impulses in the secondary windings and the correction impulses fed back to the amplifier for the arrangement shown in Fig. 1.

Assuming that a signaling current wave flowing in the output circuit of amplifier 11 is distorted and manifests itself as shown by current trace $a$ in curve A of Fig. 2, wherein the apparent shifting of the zero line of the signal is in a positive direction, the biasing current is given such value as to maintain the transformer cores saturated until the signaling current rises to an amplitude indicated by the broken line X—X which represents the normal peak value of the signaling current on the positive side, a corresponding line Y—Y being shown to represent the normal peak value of the signaling current on the negative side. Every time the signaling current rises above its normal peak value as indicated by the current trace $a$, the inductance of the primary winding rises to a high value, thereby causing an impulse to be produced in either of the windings 15 and 16. For the sake of illustration it is assumed that the impulse is produced in winding 16 when the excessive signaling current is positive and in winding 15 when the excessive signaling current is negative. Therefore, according to curve A an impulse is produced in winding 16 each time trace $a$ rises above the line X—X. Should the signaling current in rising above its normal peak value rise to such value as to saturate the transformer cores the inductance again becomes negligible and remains so as long as the core is saturated, but as soon as the current drops to a value at which the cores become unsaturated, the inductance of the primary current again rises to a high value to produce another impulse in the winding 16 but in the opposite direction. The impulses thus produced, are impressed on the rectifier 20 but only the impulses of one polarity are permitted to pass and place charges on a storing condenser 21. The charges thus stored are discharged through a resistance-capacity filter comprising resistance elements 22 and 23 and condenser 24 to place a negative potential on the grid of a vacuum tube 25 of the amplifier 11. The impulses produced in the winding 16 by the rise and fall of the signaling current through the range of amplitudes slightly above the line X—X are shown in curve B. Curve C represents the impulse wave produced by the discharge of storing condenser 21, wherein the impulses produced by the drop in the primary current are eliminated by rectifier 20 and the impulses produced by the rise of current are inverted for applying correction to the feed-back circuit connected to the grid of amplifier 25. Curve D represents the discharge of condenser 24, which discharge is impressed on the grid of amplifier 25 to restore the zero of the signaling current to its correct position, as indicated by trace $b$ in curve A.

Should zero of the signaling current shift toward the negative side the secondary impulses would be produced in winding 15, rectified by rectifier 26 and impressed on storing condenser 27. The rectified impulses may be impressed through the resistance-capacity filter comprising resistance elements 28 and 29, and condenser 24 on the grid of amplifier 25 in the manner hereinbefore described and correction in the opposite direction would thereby be effected.

Figure 3:
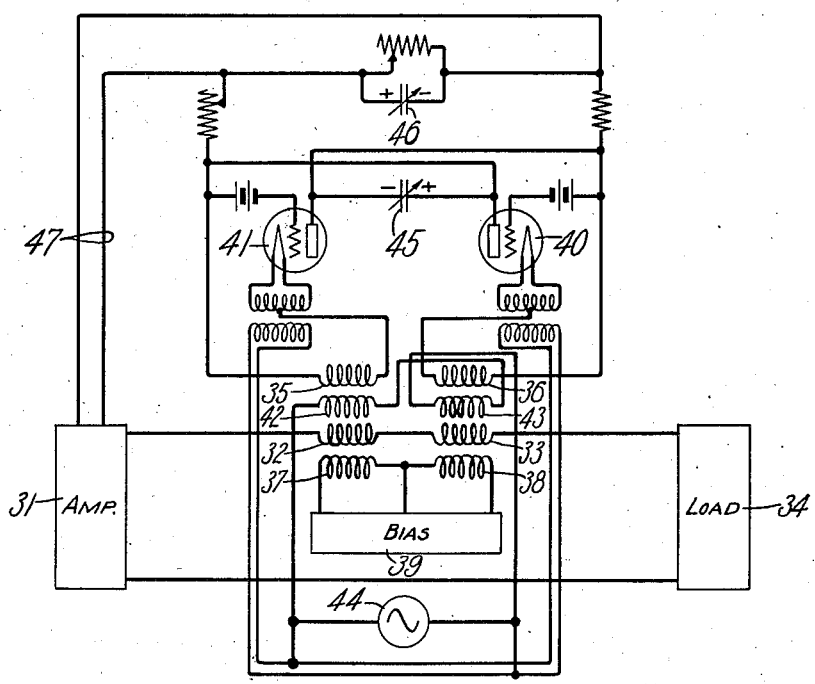
Fig. 3 shows a modification of Fig. 1 wherein rectifiers of the three-element electron discharge type are arranged to cooperate with an oscillator and a pair of oscillating windings on the transformer for effecting zero wander correction.
Figure 4:
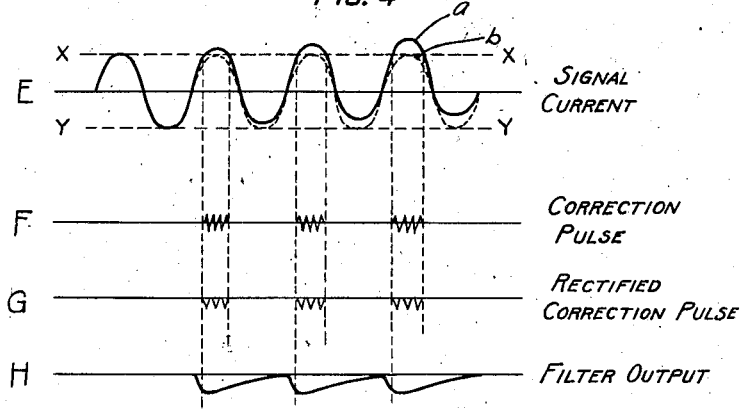
Fig. 4 represents a signal current wave and the secondary, rectified and correcting impulse waves produced by the arrangement of Fig. 3.

Fig. 3 shows another form of a zero corrector whereby high permeability transformers are employed for producing secondary voltage impulses and for impressing such impulses on the grid circuit of an amplifier to restore the zero of the signaling current to its true position. A vacuum tube amplifier 31 is connected through the primary windings 32 and 33 of a pair of high permeability transformers to a receiving circuit 34. Coils 35 and 36 are the secondary windings and coils 37 and 38 are the oppositely poled biasing windings, the latter windings being furnished with direct current from source 39. Respectively connected in the circuit of the secondary windings 35 and 36 are rectifiers 40 and 41 of a vacuum tube type. An additional pair of windings 42 and 43 are provided on the transformer cores and are connected to an oscillator 44 which is designed to deliver a current of small amplitude at about 200 cycles per second or other suitable frequency. When the signaling current wanders sufficiently to make one or the other of the secondary windings 35 and 36 active, the oscillator current passing through the windings 42 and 43 causes a series of correction pulses to be produced in the active winding of coils 35 and 36, which persist as long as the signal current is effective to maintain the interval of high inductance. The trace $a$ of curve E shown in Fig. 4 represents the signaling current wave flowing though the primary windings 32 and 33 and having its apparent zero shifting toward the positive side. Curve F shows the nature of the correcting impulse produced in either of the windings 35 or 36 each time the signaling current rises above its normal peak value where it overcomes the magnetic field set up by the biasing current in either of the windings 37 and 38. Curve G represents the rectified impulses of curve F received as charges on storing condenser 45. Curve H is the voltage wave discharge from condenser 45 of the filter network and impressed over the feedback circuit 47 on the grid of a vacuum tube (not shown) of amplifier 31. The correction impulse received from condenser 45 is effective in restoring the zero wander of the signaling current to its true position, as shown in the trace $b$ of curve E. In this form of zero corrector the oscillator current is utilized for furnishing current for the filament and the plate circuits of both rectifiers, the rectifier associated with the secondary winding which happens to be active at the time, receiving the current.

Figure 5:
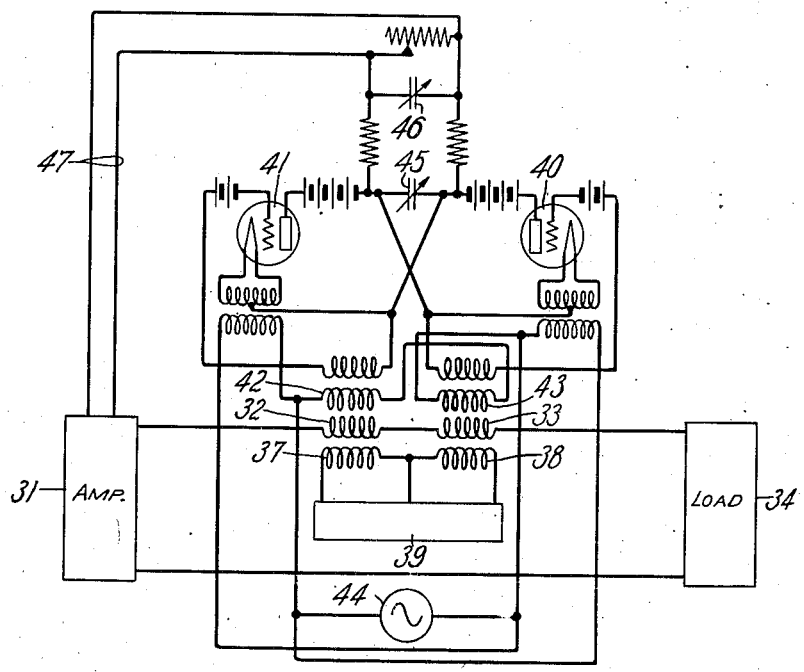
Fig. 5 illustrates a modification of Fig. 3 wherein batteries are used to furnish current for the plate circuits of the rectifiers.

Fig. 5 shows still another form of zero corrector, in which high permeability transformers are employed, which is quite similar to that shown in Fig. 3, like parts being designated by the same numerals. A difference between Fig. 3 and Fig. 5 is that separate batteries are furnished for the plate circuits of rectifiers 40 and 41 and for changing the storing condenser 45.

Figure 6:
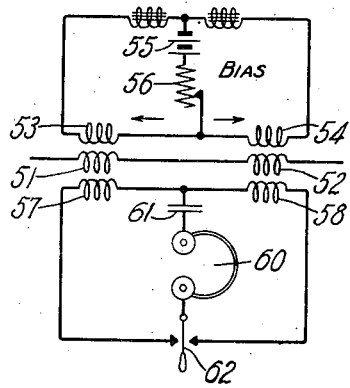
Fig. 6 illustrates the high permeability transformers connected in a circuit designed to indicate zero wander effect.

Fig. 6 shows a circuit arrangement in which a pair of high permeability transformers are employed in conjunction with an indicator for indicating when the zero of the signaling current wanders from its true position. Assuming that primary windings 51 and 52 of a pair of high permeability transformers are connected to a source (not shown) of signaling current and that the windings 53 and 54 are connected to a source 55 of direct current in such manner that the transformers are normally maintained biased in opposite directions, the biasing current from source 55 is regulated by an adjustable resistance 56 to maintain the transformer cores saturated up to the normal peak value of the signaling current. As soon as the signaling current in this arrangement exceeds its normal peak value, the magnetic field set up by the biasing current is neutralized and a voltage impulse is produced in either of the secondary windings 57 and 58, the windings selected, as stated above, depending on the polarity of the signaling current. An indicator such as a telephone receiver 60 in series with a small condenser 61 is arranged to be connected to either of the secondary windings 57 or 58. In order to take a reading or to determine the condition of a signal or current wave the biasing current is increased until the impulses produced in the secondary winding are on the point of disappearing. This is accomplished by connecting the telephone receiver to either of the secondary windings through the operation of switch 62 and by setting the biasing current at a value equal to the normal peak value of the signaling current so that a click will be heard in the telephone every time the signaling current rises to its normal peak value on either the positive or the negative side. Should the current exceed its normal peak value on one side, no click will be heard as the current reaches its peak value on the other side and therefore the unbalanced condition of the signal wave is indicated.

Figure 7:
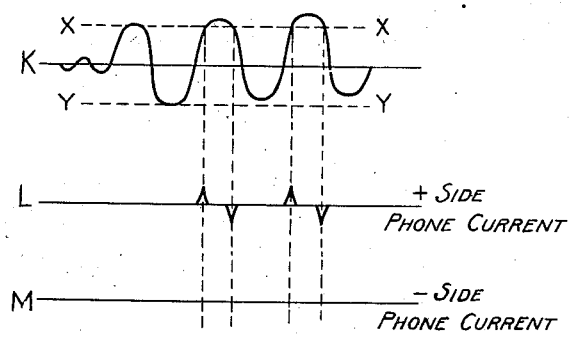
Fig. 7 graphically represents zero wander effect in the primary and secondary windings of Fig. 6.

In Fig. 7 is shown an illustration of the operation of the circuit arrangement of Fig. 6. Curve K shows a distorted signal current wave passing through the primary windings 51 and 52 with its apparent zero shifting toward the positive side, lines X—X and Y—Y indicating the normal peak values of the signaling current. Curve L shows the impulses produced in one of the secondary windings 57 or 58, each impulse being heard in the form of a sharp click in the telephone receiver as the signal current rises in value above the amplitude indicated by line X—X in curve K, whereat it overcomes the magnetic field set up by the biasing current in one of the windings 53 and 54. Line M shows the absence of impulses in the other of the secondary windings which indicates that the zero of the signaling current is shifting toward the positive side and that therefore correction is necessary to establish a balance between the positive and negative signals.

What is claimed is:

1. In combination with a signal impulse amplifier, a work circuit having a quiescent condition during the reception of impulses of normal maximum amplitude, a coil connected to the output circuit of the amplifier, and a biasing source of electromotive force supplying current for said coil adapted to maintain it magnetically biased up to an intensity equal to that of the normal maximum amplitude of the received signal impulses, said work circuit being connected to said coil for receiving therefrom short sharp impulses produced by the reception of a signal wave departing from the zero axis of impulses by more than a normal maximum amplitude, and the consequent overcoming of the biasing current of said coil, whereby the quiescent condition of said work circuit is changed to an energized condition.

2. In a signal receiving system, a combination of elements for producing a correction for zero wander comprising an amplifier, a coil connected to the output circuit of said amplifier, a biasing source of electromotive force supplying current for said coil adapted to normally maintain it magnetically biased, a circuit connected to said coil for receiving short sharp impulses produced by the signal wave impressed upon said coil, exceeding its normal amplitude and overcoming the biasing current, and means operatively related to said last mentioned circuit and controlled by the short sharp impulses for impressing a voltage on the input circuit of said amplifier in opposition to the input voltage.

3. A system in accordance with claim 2 in which the last mentioned circuit includes a rectifier.

4. A system in accordance with claim 2 in which the last mentioned circuit includes a unidirectional space discharge device and an energy transferring system extending from said device to the input circuit of the amplifier.

5. A system in accordance with claim 2 in which two biased coils are provided in the output circuit of the amplifier, each being individually operatively connected to supply individual rectifiers in combination with circuit connections extending to the input circuit of the amplifier whereby the rectifiers produce, when energized, opposing effects upon the input circuit.

6. In a signal impulse amplifier, means for correcting zero wander comprising a feedback circuit coupled by electrical couplings to the output circuit of said amplifier and connected to the input circuit thereof, and devices connected to said couplings for preventing transfer of energy thereby, unless and until the amplifier impulses exceed a normal positive or negative value.

7. In a signal impulse amplifier, means for correcting zero wander comprising a feedback circuit coupled by electrical couplings to the output circuit of said amplifier and connected to the input circuit thereof, devices connected to said couplings for preventing transfer of energy thereby, unless and until the amplified impulses exceed a normal positive or negative value, and means selective in accordance with the sign of impulses exceeding positive or negative values determining the corrective effect of the energy fed back.

8. In a signal impulse amplifier, means for correcting zero wander comprising a feedback circuit electrically connected in a fixed state of continuity by electrical couplings to the output circuit of said amplifier and connected to the input circuit thereof, and devices connected to said couplings for preventing transfer of energy thereby unless and until the amplified impulses exceed a normal positive or negative value.

9. In a signal receiving system, an amplifier for increasing the strength of current impulses received from an incoming circuit, comprising an input and an output circuit, a compensating circuit in a fixed state of continuity inductively connected to said output circuit and directly connected to said input circuit, a circuit including inductance coils for preventing said compensating circuit from functioning on signal impulses of normal amplitude, and means in said compensating circuit for impressing on said input circuit, when the incoming signals exceed their normal peak values, compensating voltages whereby the distortion in the zero axis of incoming signals is corrected.

10. In a signal receiving system, an amplifier for increasing the strength of current impulses received from a line, comprising an input and an output circuit, an inductive element in said output circuit for inductively connecting to said output circuit a biasing circuit, an oscillating circuit and a compensating circuit included in said input circuit, the current in said biasing circuit being effective to prevent the current in said oscillating circuit from being induced in said compensating circuit until its current exceeds its normal peak values, and means in said compensating circuit for rectifying and changing the polarity of said induced voltages to effect correction for distortion in the zero axis of the signals received in the input circuit.

11. In a signal receiving system, a line, a biasing circuit and a third circuit inductively connected to said line, and indicating means in said third circuit, the current in said biasing circuit being arranged to prevent inductive coupling between said line and said third circuit until the incoming signal current exceeds its normal peak values at which time the inductive coupling suddenly rises to a high value and produces voltage impulses in said third circuit to operate said indicating means.

12. In a signal receiving system, a device for correcting the zero wander effect in received signals of varying amplitudes comprising an amplifier, a plurality of coils connected to the output circuit of said amplifier, said coils having core material of high permeability at low magnetizing forces, a plurality of other coils respectively connected to the first mentioned coils, a source of current connected to said second mentioned coil to normally maintain the cores of said first mentioned coils magnetically saturated in opposite directions when the signaling current in said first mentioned coils is passing through amplitudes between zero and its normal peak value, a plurality of circuits respectively connected to said first mentioned coils, each including another coil, a rectifier and an energy transferring element, wherein voltage impulses of opposite polarities are produced every time the current in the first mentioned coils rises and falls through its normal peak values, and means connected in common to said plurality of circuits for utilizing said voltage impulses to produce opposing effects upon the signaling current in the input circuit of said amplifier.

In witness whereof, I hereunto subscribe my name this 16th day of July, 1928.

EVERETT T. BURTON.